(12) United States Patent
Mittal (10) Patent No.: US 8,683,917 B2
(45) Date of Patent: Apr. 1, 2014

(54) STENCIL ASSEMBLY FOR DEPOSITING FOOD PRODUCT AND RELATED SANDWICHING MACHINE

(75) Inventor: Ankush B. Mittal, Bowling Green, OH (US)

(73) Assignee: Illinois Tool Works Inc., Glenview, IL (US)

( * ) Notice: Subject to any disclaimer, the term of this patent is extended or adjusted under 35 U.S.C. 154(b) by 593 days.

(21) Appl. No.: 12/651,544

(22) Filed: Jan. 4, 2010

(65) Prior Publication Data

US 2011/0162536 A1 Jul. 7, 2011

(51) Int. Cl.
*A23B 4/00* (2006.01)
*A21D 2/16* (2006.01)

(52) U.S. Cl.
USPC .............................................. 99/516; 426/653

(58) Field of Classification Search
USPC .......... 99/450–450.8, 450.4, 450.7, 516, 345, 99/360, 444; 118/25, 301, 313; 426/496, 426/653
See application file for complete search history.

(56) References Cited

U.S. PATENT DOCUMENTS

| | | | | |
|---|---|---|---|---|
| 3,340,824 | A * | 9/1967 | Talbot | 425/381 |
| 3,712,264 | A * | 1/1973 | Verhoeven | 118/25 |
| 4,162,882 | A * | 7/1979 | Rose | 425/382 R |
| 4,469,021 | A * | 9/1984 | Rose et al. | 99/450.4 |
| 4,502,376 | A | 3/1985 | Cossé | |
| 4,570,298 | A * | 2/1986 | Tribbett | 425/133.1 |
| 4,615,264 | A * | 10/1986 | Rose | 99/450.4 |
| 4,708,054 | A * | 11/1987 | Newbery et al. | 99/450.4 |
| 5,692,433 | A * | 12/1997 | Akesson et al. | 99/450.4 |
| 5,974,958 | A * | 11/1999 | Lilley et al. | 99/450.4 |
| 6,955,722 | B2 * | 10/2005 | Ackerman | 118/315 |
| 8,071,151 | B2 * | 12/2011 | Wilkey | 426/653 |
| 2004/0159248 | A1 | 8/2004 | Wilkey | |

FOREIGN PATENT DOCUMENTS

| | | |
|---|---|---|
| CN | 2824594 | 10/2006 |
| EP | 0082085 | 6/1983 |
| EP | 0785721 B1 | 7/1997 |
| GB | 884710 | 12/1961 |
| WO | 96/12409 | 5/1996 |

OTHER PUBLICATIONS

PCT, International Search Report and Written Opinion, International Application No. PCT/US2010/060461 (Apr. 6, 2011).
PT Sandwiching Machine, Operator Manual, Peters Machinery, Revised Apr. 2, 2003; pp. 1-36.

* cited by examiner

*Primary Examiner* — Gene Kim
*Assistant Examiner* — Matthew B Stanczak
(74) *Attorney, Agent, or Firm* — Thompson Hine LLP (57) ABSTRACT

A stencil assembly for use in depositing filling onto wafers includes a stencil tube defining a lengthwise passage for flow of filling, the stencil tube including an outer surface, and at least two axially spaced apart filling outlets passing through a wall of the tube. A first stencil die is positioned along the stencil tube and has an inner surface facing the outer surface of the tube in a region axially aligned with one filling outlet of the stencil tube, the first stencil die including at least one outlet extending from the inner surface of the first stencil die to an outer surface of the first stencil die. A second stencil die is positioned along the stencil tube and spaced from the first stencil die, the second stencil die having an inner surface facing the outer surface of the tube in a region axially aligned with another filling outlet of the stencil tube, the second stencil die including at least one outlet extending from the inner surface of the second stencil die to an outer surface of the second stencil die.

11 Claims, 7 Drawing Sheets

STENCIL ASSEMBLY FOR DEPOSITING FOOD PRODUCT AND RELATED SANDWICHING MACHINE

TECHNICAL FIELD

The present invention relates generally to sandwiching machines that deposit edible fillings between two wafers to form an edible sandwich product and, more particularly, to stencil assemblies utilized in such machines.

BACKGROUND

Systems are known that assemble sandwich type snacks by placing cream, cheese, peanut butter or other filling between two cookies or crackers or other edible wafers. Rotating stencil dies are commonly used to deposit the filling onto the edible wafers as the wafers move below and past the rotating stencil die along a conveyor line. Each stencil assembly includes a single stencil die along its length. Arrangements using multiple stencil assemblies, each with a single stencil die, are known, with the stencil assemblies being offset in the direction of travel of the wafers. Where multiple rows of wafers are conveyed, it is known for the stencil die of one stencil assembly to be laterally offset from the stencil die of a next stencil assembly, such the stencil die of the one stencil assembly operates to deposit filling on wafers traveling in, for example, first and second conveyance rows, and such that the stencil dies of the next stencil assembly operates to deposit filling on wafers traveling in, for example, third and fourth conveyance rows. Each stencil assembly includes its own stencil drive bracketing and stencil drive assembly for rotation of the stencil die of the stencil assembly.

It would be desirable to provide a stencil assembly that is more readily adaptable for multiple row operation and which can be used with existing stencil die configurations.

SUMMARY

In one aspect, a stencil assembly for use in depositing filling onto wafers includes a stencil tube defining a lengthwise passage for flow of filling, the stencil tube including an outer surface, and at least two axially spaced apart filling outlets passing through a wall of the tube. A first stencil die is positioned along the stencil tube and has an inner surface facing the outer surface of the tube in a region axially aligned with one filling outlet of the stencil tube, the first stencil die including at least one outlet extending from the inner surface of the first stencil die to an outer surface of the first stencil die. A second stencil die is positioned along the stencil tube and spaced from the first stencil die, the second stencil die having an inner surface facing the outer surface of the tube in a region axially aligned with another filling outlet of the stencil tube, the second stencil die including at least one outlet extending from the inner surface of the second stencil die to an outer surface of the second stencil die.

The stencil assembly of the above paragraph may include a drive operatively linked to rotate the first stencil die about the stencil tube, and a mechanical coupling linking the second stencil die to the first stencil die such that rotation of the first stencil die by the drive effects simultaneous and synchronous rotation of the second stencil die. The stencil assembly of the above paragraph may also include a first filling infeed path at a first end of the stencil assembly for delivering filling into the stencil tube, a first shut off valve extending from the first end of the stencil assembly into the stencil tube and having a distal end configured for sealing against an inner surface of the stencil tube, a second filling infeed path at a second end of the stencil assembly for delivering filling into the stencil tube and a second shut off valve extending from the second end of the stencil assembly into the stencil tube and having a distal end configured for sealing against the inner surface of the stencil tube.

In another aspect, a stencil assembly for use in depositing filling onto wafers includes a stencil tube defining a lengthwise passage for flow of filling, the stencil tube including an outer surface, and at least first, second, third and fourth axially spaced apart filling outlets passing through a wall of the stencil tube. A first stencil die is positioned along the stencil tube in a region overlapping with the first and second filling outlets of the stencil tube, the first stencil die including a first set of outlet openings aligned to receive filling passing through the first filling outlet of the stencil tube and a second set of outlet openings aligned to received filling passing through the second filling outlet of the stencil tube. A second stencil die is positioned along the stencil tube in a region overlapping with the third and fourth filling outlets of the stencil tube, the second stencil die including a first set of outlet openings aligned to receive filling passing through the third filling outlet of the stencil tube and a second set of outlet openings aligned to received filling passing through the fourth filling outlet of the stencil tube.

The stencil assembly if the immediately preceding paragraph may include separate filling infeeds at opposite ends of the stencil assembly, one for each stencil die. The stencil assembly of the immediately preceding paragraph may also include two separate shut-off valves extending inward along the stencil tube from opposite ends of the stencil tube for controlling flow to each respective stencil die.

The details of one or more embodiments are set forth in the accompanying drawings and the description below. Other features, objects, and advantages will be apparent from the description and drawings, and from the claims.

DETAILED DESCRIPTION

Figure 1:
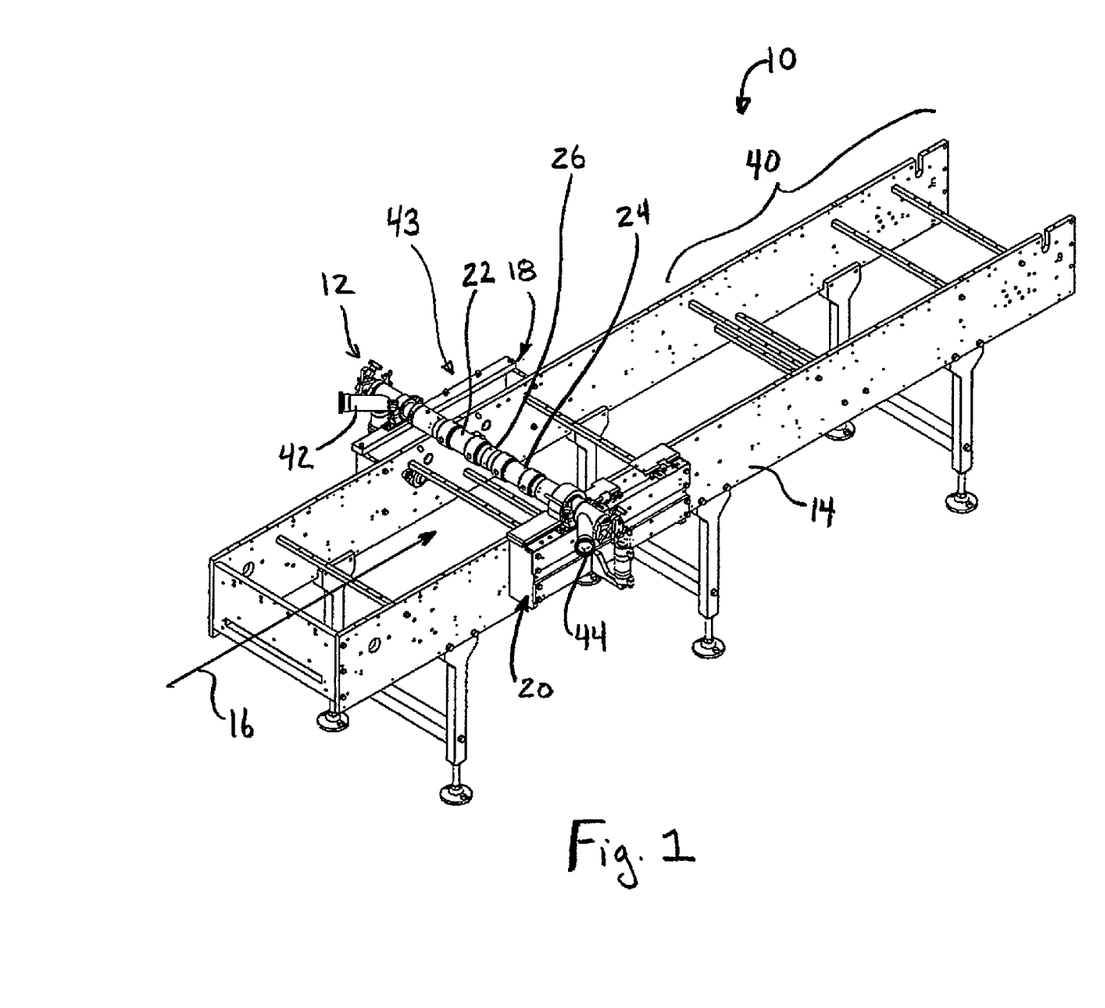
FIG. 1 is a partial perspective view of a sandwiching machine including a stencil assembly with two stencil dies.
Figure 2:
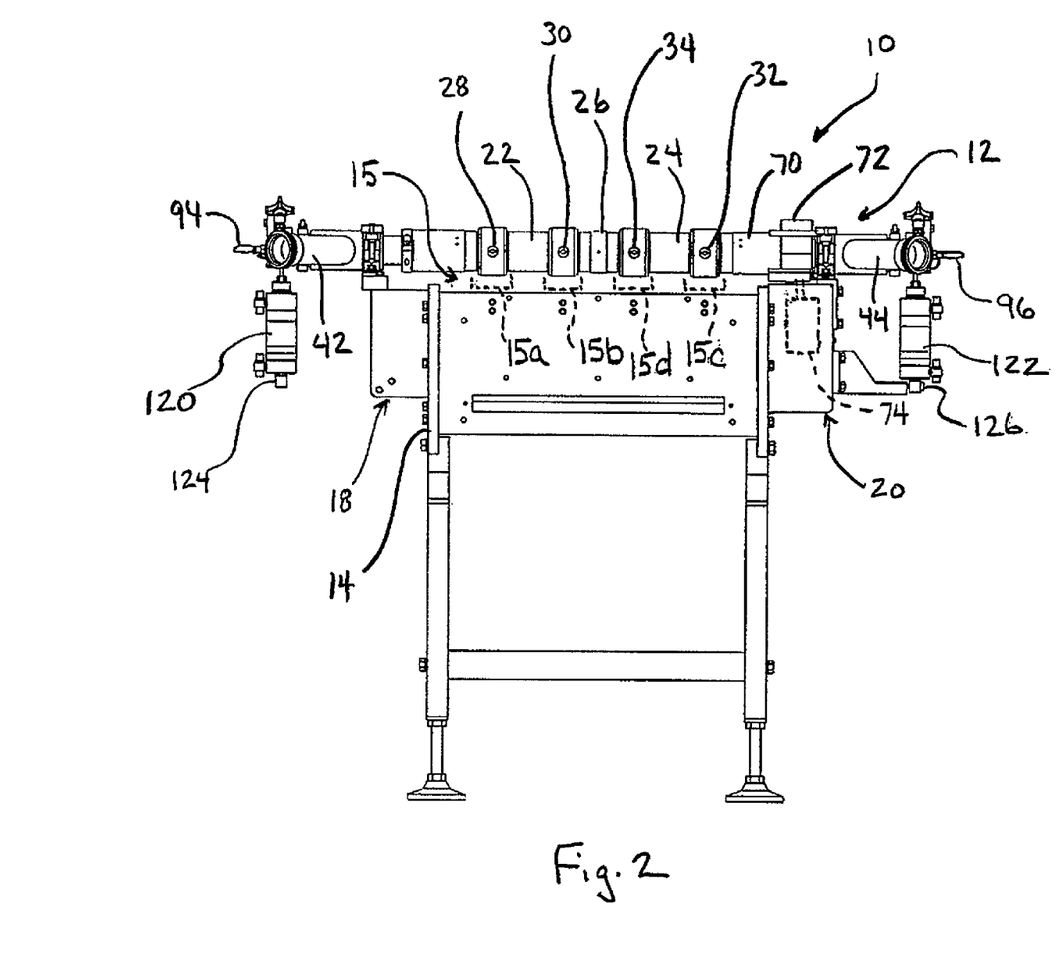
FIG. 2 is a front elevation of the machine of FIG. 1.

Referring to FIGS. 1 and 2, a perspective partial view of a sandwiching machine 10 and a front view of the machine 10 are shown respectively, with a stencil assembly 12 mounted to a frame 14 that also supports a wafer conveyor 15 (not shown in FIG. 1 for clarity and shown in schematic form in FIG. 2 with wafer conveying lanes 15a, 15b, 15c and 15d) that carries edible wafers (e.g., cookies, crackers or other edible foodstuff) in a travel direction reflected by arrow 16 of FIG. 1. As shown, the frame 14 includes side supporting structures 18 and 20 for supporting opposite ends of the stencil assembly 12 in an orientation and position such that the stencil assembly 12 extends generally perpendicular to the wafer travel direction 16 and is positioned above the wafers traveling along the conveyor 15 so that filling can be deposited on the moving wafers.

Figure 3:
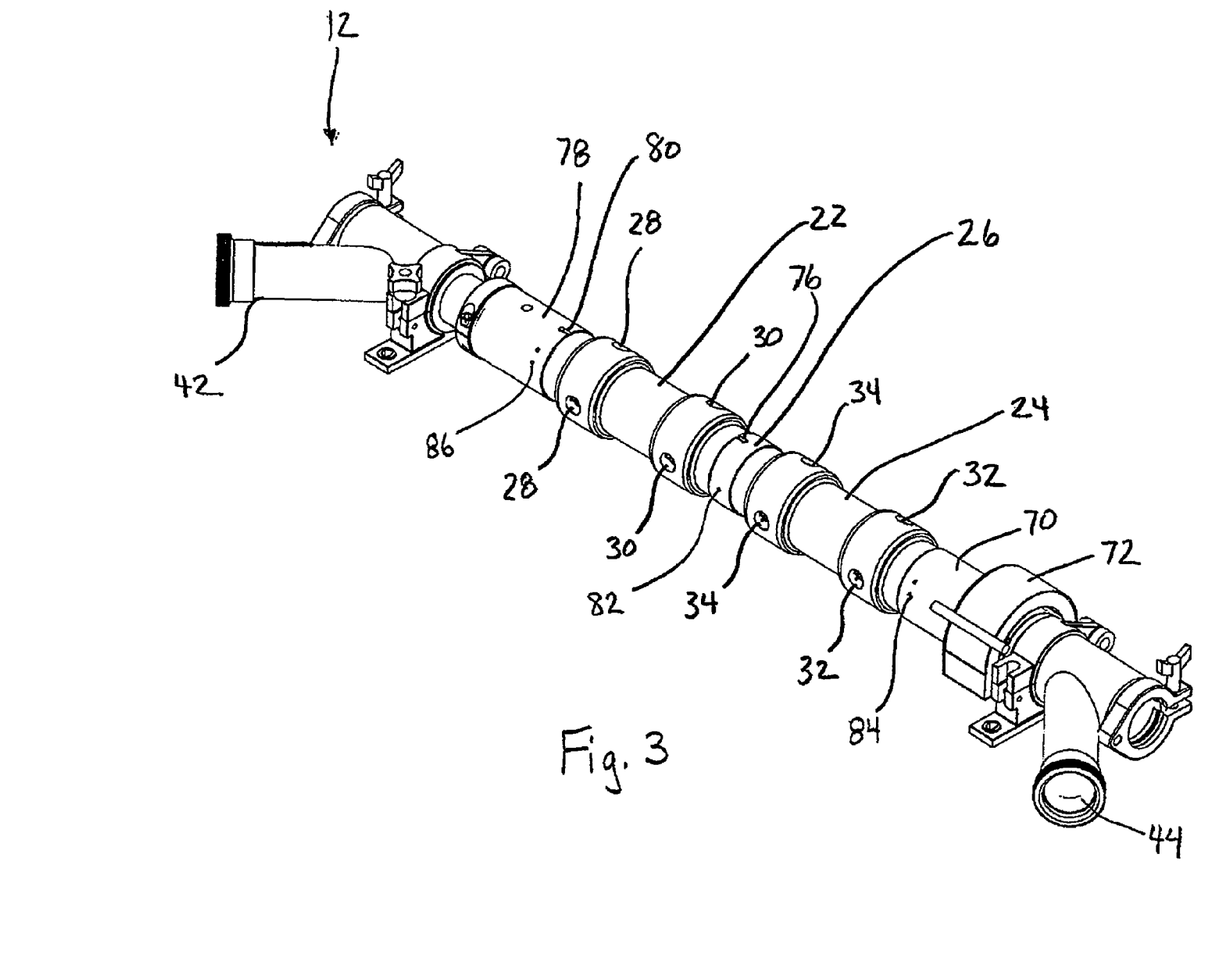
FIG. 3 is a partial perspective view of the stencil assembly of FIG. 1.

In this regard, and referring primarily to FIGS. 2 and 3, the stencil assembly 12 includes two distinct stencil dies 22 and 24 positioned thereon and mechanically coupled together by an annular band or hub 26. Stencil die 22 includes two sets of spaced apart filling outlets 28 and 30 and stencil die 24 includes two sets of spaced apart filling outlets 32 and 34. Each set of outlets is distributed around the circumferential outer surface of the respective stencil die. By way of example, each set of filling outlets may consist of a set of three outlets spaced apart from each other by one-hundred twenty degrees. As best seen in FIG. 2, each wafer conveying row or lane is aligned with a respective one of the sets of stencil die filling outlets so that filling exiting the stencil die filling outlets during rotation of the stencil dies can be cut from the stencil (e.g., typically by a stationary cutting wire positioned immediate the outer surface of the stencil die) and drop onto a wafer.

Referring again to FIG. 1, once all filling has been applied to the conveyed wafer, a top wafer may be applied to bottom wafer with filling to complete the sandwich in a downstream section 40 of the machine 10. Although a single stencil assembly is shown in FIG. 1, additional stencil assemblies may be added to the machine for increase flexibility or more complex applications of filling as may be needed. In this regard, the illustrated machine includes a downstream mount location 43 at which another stencil assembly could be positioned.

Figure 4:
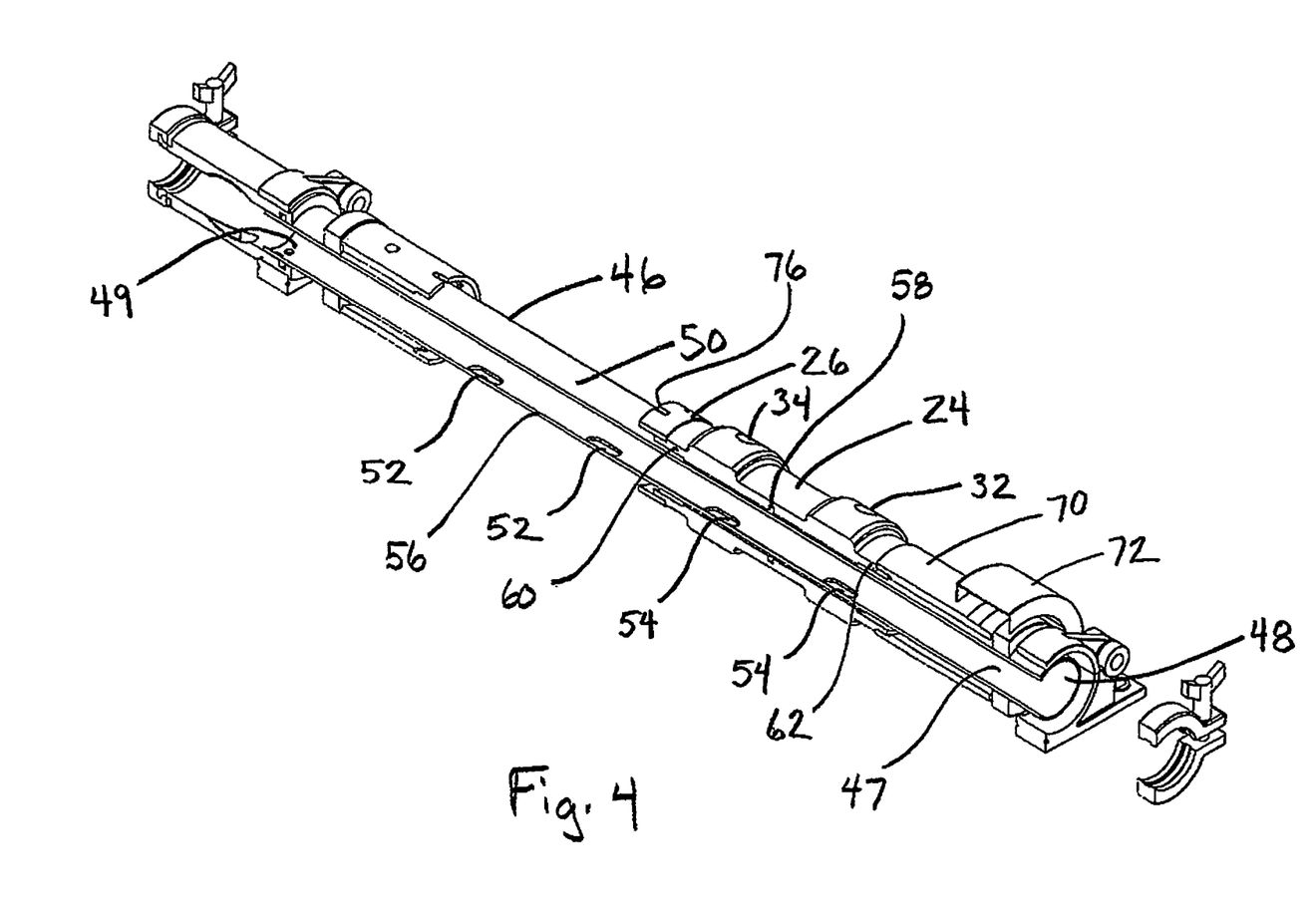
FIG. 4 is a cross-section, partial view of the stencil assembly of FIG. 3 with certain components removed.

The stencil assembly includes filling infeed paths 42 and 44 at respective ends of the stencil assembly, with path 42 delivering filling for stencil die 22 and path 44 delivering filling for stencil die 24. In this regard, FIG. 4 is a partial cross-section of the assembly with certain components removed, including the infeed paths and the stencil die 22, to show a common stencil tube 46 about which both stencil dies are mounted for rotation. The stationary stencil tube 46 defines a lengthwise passage 47 for flow of filling. The infeed path 44 delivers filling into one end 48 of the stencil tube 46 and the infeed path 42 delivers filling into the opposite end 49 of the filling tube. The stencil tube includes an outer surface 50 and axially spaced apart filling outlets 52 and 54 passing through the wall 56 of the tube. The stencil die 22 overlaps with the outlets 52 so that filling is fed to the stencil die 22 through the outlets 52, and the stencil die 24 overlaps with the stencil die 24 so that filling is fed to the stencil die 24 through the outlets 54.

Referring to stencil die 24, the stencil die includes an inner surface that faces the outer surface 50 of the stencil tube 46 and which is spaced from the outer surface 50 to provide a small annular space in which filling that has exited the outlets 54 can flow to reach all of the outlets 52 and 54. This annular space is divided into two segments to the left and right of an o-ring type seal 58 that is seated in a recess in the inner surface of the stencil die 24, where the o-ring operates in sliding contact with the outer surface 50 of the stencil tube 46. Thus, filling that flows through the left outlet 54 subsequently reaches and flows from the stencil die outlets 34, and filling that flows through the right outlet 54 subsequently reaches and flows from the stencil dies outlets 32. The inner surface of the stencil die 24 is threaded at its end sections 60 and 62, with the threads in contact with and sliding relative to the outer surface 50 of the tube 46. In each case the threads are oriented such that the rotation of the threads relative to the surface 50 tends to urge filling back into the annular space between the outer surface of the stencil tube and the inner surface of the stencil die. The threads therefore act as a type of moving seal.

Though not shown in FIG. 4, stencil die 22 has a similar configuration. The thread sections may take the form of inserts at the ends of the stencil dies so that they can be replaced in the event of excessive wear.

Rotation of the stencil tubes 22 and 24 is achieved via a drive coupler 70 that is driven by a gear arrangement in gear housing 72, with the gear arrangement driven by a drive motor 74 shown schematically in FIG. 2. The drive coupler transmits torque to the stencil tube 24 via a keyway connection, with the drive coupler including a key slot that receives a key protruding from the outer surface of the stencil die at its right end (relative to the view of 2). In turn, the stencil die 24 transmits torque to the annular band 26 via a keyed connection, with the annular band including a right end key slot that receives a key protruding from the outer surface of the stencil die 24 at its left end. Likewise, the band 26 transmits the torque to the stencil die 22 via a keyed connection, with the annular band including a left end key slot 76 that receives a key protruding from the outer surface of the stencil die 22 at its right end. The stencil die 22 transmits the torque to an end support coupler 78 via a keyed connection 80. In the illustrated arrangement, the annular band 26 supported on the stencil assembly 12 entirely by connection with the stencil dies 22 and 24. The annular band 26 includes one or more openings 82 in its wall that will permit filling to flow through the band in the event that some filling leaks past the thread seals of the stencil dies 22 and 24, thereby enabling an operator to appreciate that some repair or adjustment is appropriate. Similar openings 84 and 86 may be provided in the respective walls of the drive coupler 70 and the support coupler 78. Where the two stencil dies are positioned axially close together (e.g., within several inches of each other) it may be necessary for the opposite end key slots of the band to be offset circumferentially so that the band has sufficient strength to transmit the torque loads required. In this regard, given the nature and configuration of existing stencil dies, the circumferential offset between the key slots of the band should be consistent with the circumferential spacing between the outlets of the stencil die (e.g., in the illustrated case one-hundred and twenty degrees) so that the outlets of the two stencil dies are aligned circumferentially.

Figure 5:
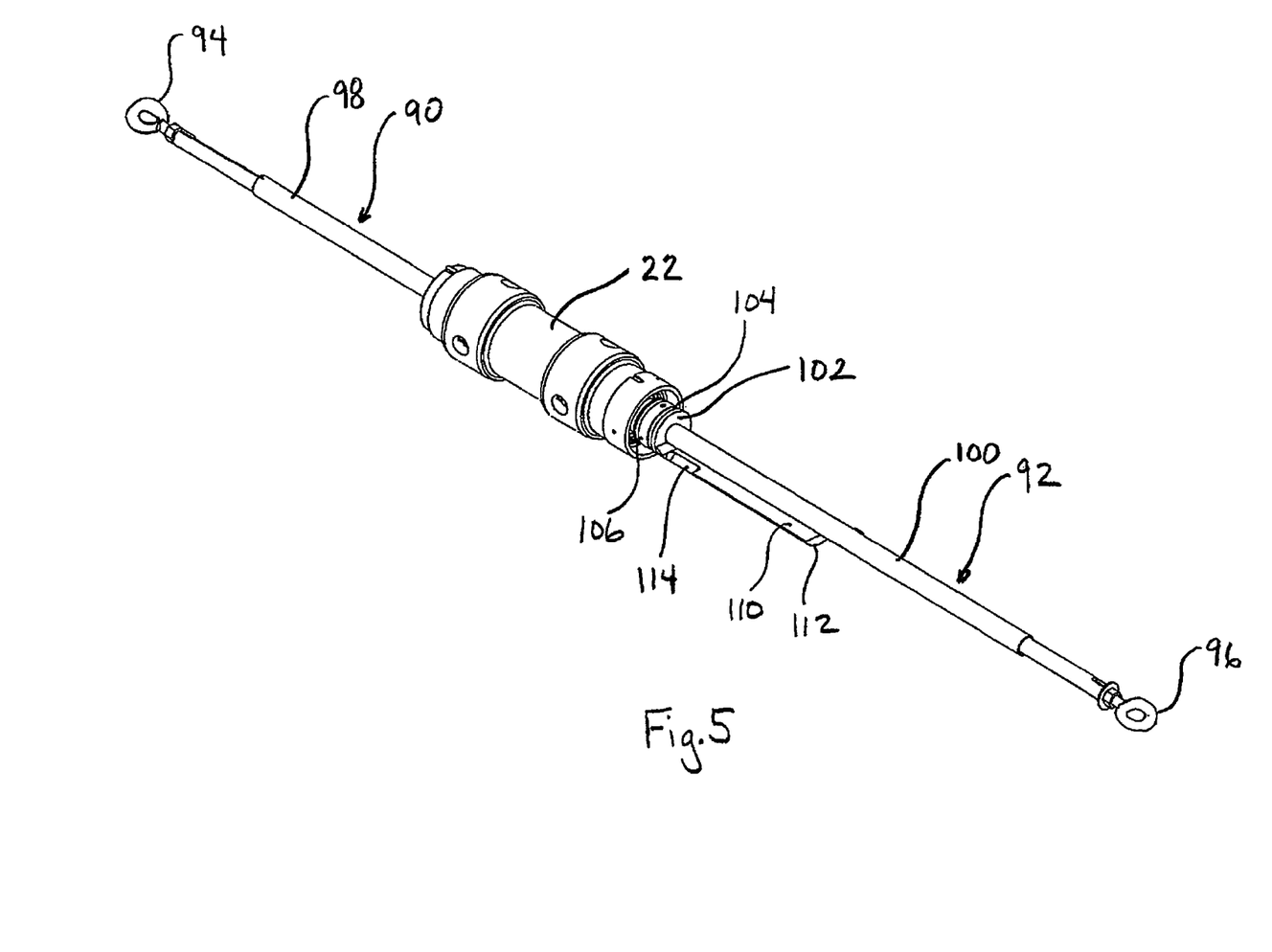
FIG. 5 is a partial perspective view of the stencil assembly showing two shut-off valves of the assembly.

Referring now to FIG. 5, shut-off valves 90 and 92 extend inward within the stencil tube (not shown in FIG. 5) from respective ends of the stencil assembly. The shut-off valves include respective end rings 94 and 96 coupled to shafts 98 and 100 having distal ends with end plugs 102 (only one shown) having associated axially spaced apart external o-rings 104 and 106 that are configured to engage and seal against the inner surface of the stencil tube so that, in the case of shut-off valve 90 its end plug prevents filling entering the infeed path 42 from moving along the tube (left to right in the view of FIG. 2) past the end plug and, in the case of shut-off valve 92 its end plug prevents filling entering the infeed path 44 from moving along the tube (right to left in the view of FIG. 2) past the end plug. The stencil tube outlets 52 (FIG. 4) are positioned between the left end of the stencil tube and the end plug of the shut-off valve 90, and the stencil tube outlets 54 are positioned between the right end of the stencil tube and the end plug of the shut-off valve 92. Thus, each stencil die 22 and 24 has a separate, independent infeed path for receiving a flow of filling. In embodiments in which the two stencil dies 22 and 24 are positioned axially close to each other, the plug ends of the two shut-off valves will be positioned proximate each other within the tube (i.e., within several inches of each other).

Figure 6:
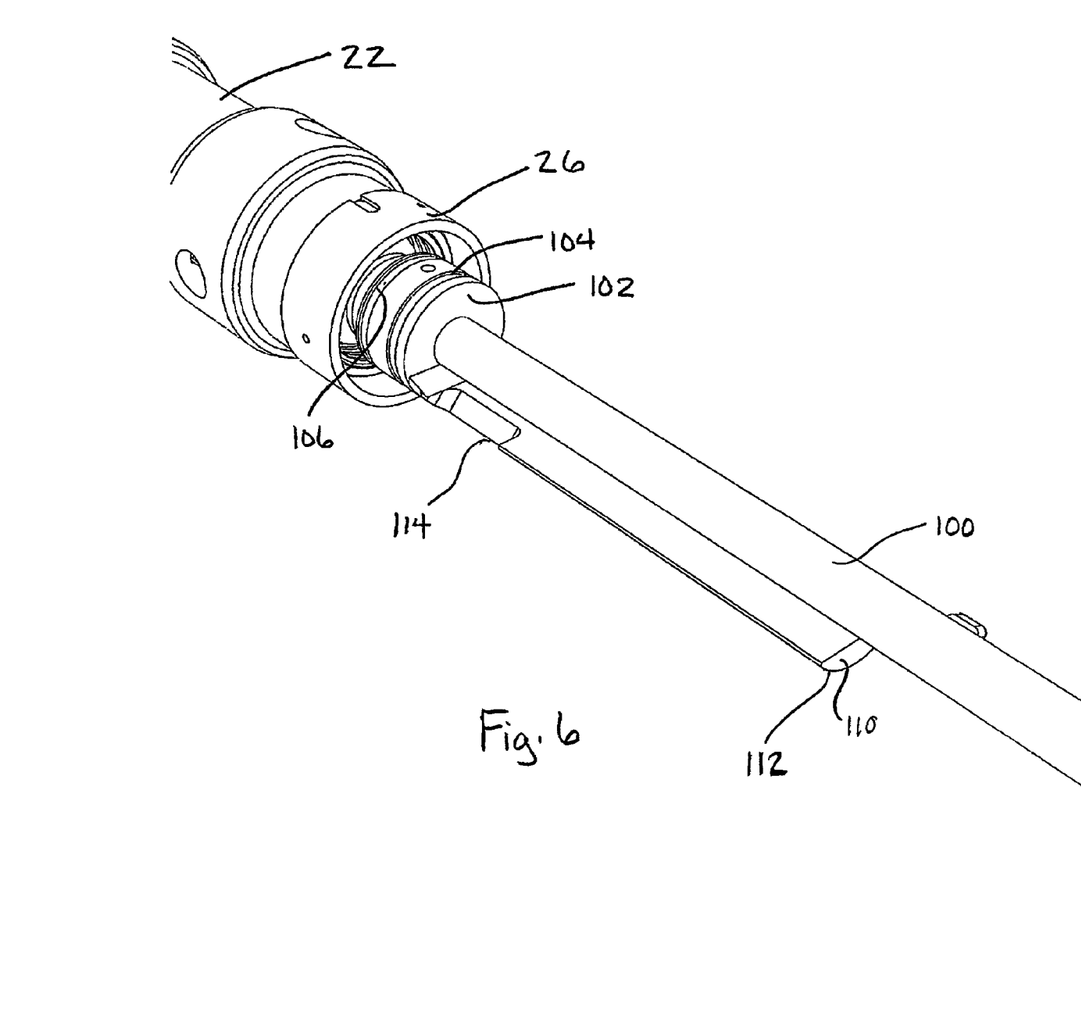
FIG. 6 is an enlarged partial view of FIG. 5.

Referring to the shut-off valve 92, and the enlarged partial view of FIG. 6 in particular, the valve includes a closure member 110 with an external surface 112 that is in contact with the inner surface of the stencil tube (not shown). Rotation of the shaft 100 effects rotation of the closure member 110 relative to the stencil tube outlets 54 (FIG. 4) so that when the shut-off valve is in a closed position the surface 112 covers both outlets 54 and prevents filling from passing from within the stencil tube to the stencil die 24. When the shut-off valve is in an open position the surface 112 is positioned to allow flow through both stencil tube outlets 54. In the illustrated embodiment, the surface 112 is shaped with a cut-out section 114 that aligns with the stencil tube outlet 54 that is most inward along the tube from the infeed end. This configuration allows the most inward outlet 54 to be fully-open while the other outlet 54 is only partially open so that the flow area through the most inward outlet 54 is greater than the flow area through the other stencil tube outlet 54. Due to the different pressures seen by the two outlets 54 (i.e., the most inward outlet 54 sees a lower pressure) this difference in flow area actually promotes a more uniform and comparable flow through the two outlets 54. Other techniques for shaping and configuring the surface 112 and outlets 54 might be used to achieve this result.

Referring again to FIG. 2, each shut-off valve 90 and 92 may include an associated actuator 120 and 122 for controllably rotating the shut-off valve between the open and closed positions. In the illustrated embodiment each actuator takes the form of a linear actuator (e.g., a pneumatic actuator) with a lower housing that is pivotally linked at its lower end to part of the machine 10 at respective pivot points 124 and 126, and having an upper actuation rod that is pivotally linked to a lever-type member or assembly that is connect to rotate the shut-off valve when the actuation rod extends or retracts from the actuator housing.

The stencil assembly described above advantageously provides two stencil dies on the same stencil assembly, reducing the amount of mount hardware and drive hardware needed to provide a four row sandwich machine, as in the past such a machine would have required two separate stencil assemblies, each with a single stencil die. Moreover, the multi stencil die stencil assembly reduces cost and saves space for more advanced sandwich machine production, such as six lane machines and machines using multiple filling types.

By way of example, and referring to FIG. 1, in one implementation the machine 10 may connected such that filling infeed 42 receives one filling type (e.g., vanilla), which is then delivered by the stencil die 22 to two wafer conveying rows (e.g., rows 15a and 15b) while the filling infeed 44 is connected to receive another, different filling type (e.g., chocolate), which is then delivered to two distinct wafer conveying rows (e.g., 15c and 15d), thereby enabling the same stencil assembly to be simultaneously used to product two different types of sandwiches. Many other variations are possible as well.

Figure 7:
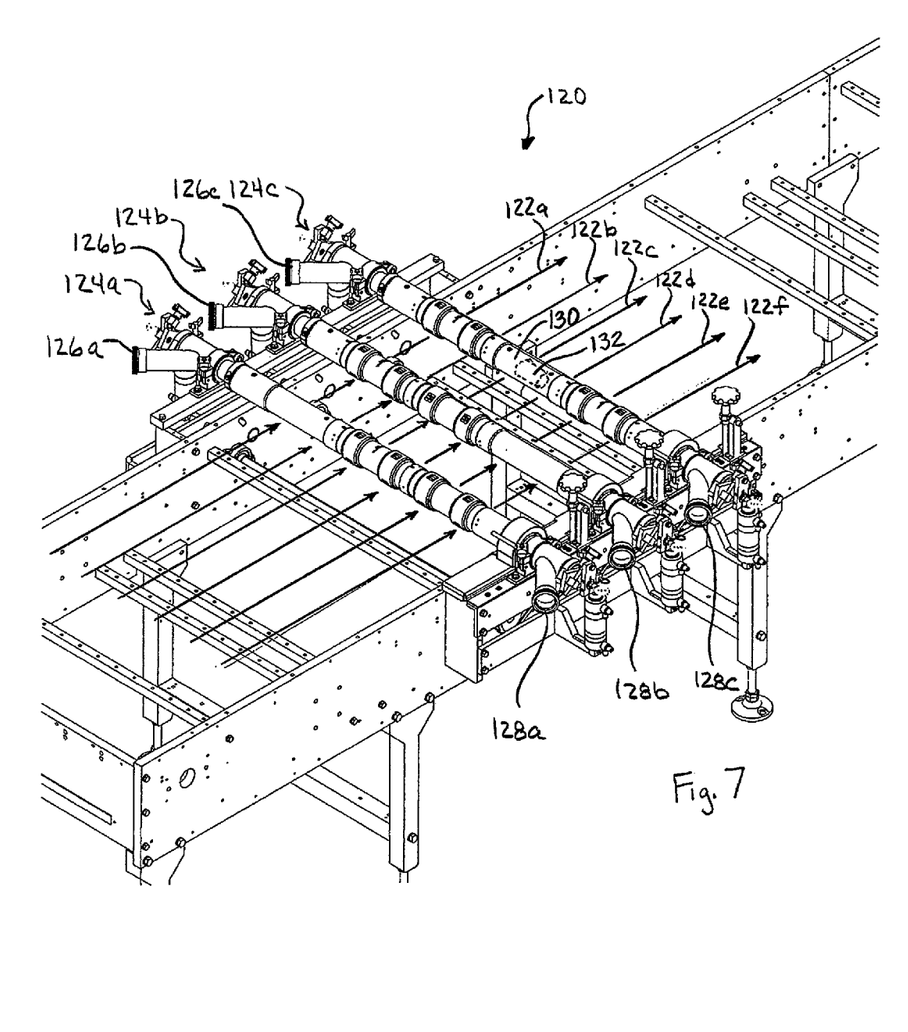
FIG. 7 is a partial perspective view of a six lane sandwiching machine including three stencil assemblies, each of which has two stencil dies.

For example, and referring to FIG. 7, a perspective view a sandwiching machine 120 including a wafer conveyor mechanism represented schematically by arrows 122a-122f showing six wafer convey rows or lanes, is provided. The machine 120 includes three stencil assemblies 124a, 124b and 124c. Each stencil assembly includes two stencil dies similar to that described above, with the stencil dies on each of stencil assemblies 124a and 124b positioned axially close to each other, while the stencil dies on stencil assembly 124c are axially spaced apart from each other. Each stencil assembly includes a respective left filling infeed path 126a-126c that feeds the left most stencil die of its respective assembly, and a right filling infeed path 128a-128c that feeds the right most stencil dies of its respective assembly. A sandwiching machine with the illustrated construction can be used to produce sandwiches having two distinct filling flavors on each sandwich.

By way of example, the machine 120 is connected so that filling infeeds 126a, 126b and 128c receive a first filling type (e.g., vanilla flavor creme) and so that filling infeeds 126c, 128a and 128b receive a different filling type (e.g., strawberry flavor creme). Thus, wafers traveling along wafer conveying rows 122e and 122f receive an initial strawberry flavor deposit from the right stencil die of stencil assembly 124a and wafers travelling along wafer conveying rows 122c and 122d receive an initial vanilla flavor deposit from the left stencil die of stencil assembly 124a. The wafers traveling along wafer conveying rows 122a and 122b do not receive any deposits from the stencil assembly 124a. Next, the wafers traveling along rows 122a and 122b receive an initial vanilla flavor deposit from the left stencil die of stencil assembly 124b and the wafers traveling along rows 122c and 122d receive a secondary strawberry deposit (atop the initial strawberry deposit) via the right stencil die of stencil assembly 124b. The wafers traveling along rows 122e and 122f do not receive and deposit from the stencil assembly 124b. Finally, the wafers traveling along rows 122a and 122b receive a secondary strawberry flavor deposit (atop the initial vanilla deposit) from the left stencil die of stencil assembly 124c and the wafers traveling along rows 122e and 122f receive a secondary vanilla flavor deposit (atop the initial strawberry deposit) from the right stencil die of stencil assembly 124c. Wafers traveling along rows 122c and 122d do not receive any deposits from the stencil assembly 124c. All six rows of wafers then have a two-flavor deposit and a top wafer can be applied to each downstream. Many other advantageous variations of multiple flavor machines are facilitated by using the two stencil die stencil assemblies of the present application.

With respect to the stencil assembly 124c, as shown the two stencil dies are separated along the axis of the stencil assembly by a distance much greater than that of the stencil dies of assemblies 124a and 124b. In such an embodiment, an elongated coupler 130 is used to transmit rotational torque from one stencil die to the other. In this regard, it may be desirable to provide a bushing 132 internal of the coupler 130 and about the stencil die tube for support of the coupler relative to the stencil die tube.

It is to be clearly understood that the above description is intended by way of illustration and example only, is not intended to be taken by way of limitation, and that other changes and modifications are possible.

What is claimed is:

1. A stencil assembly for use in depositing filling onto wafers, the stencil assembly comprising:
   a stencil tube defining a lengthwise passage for flow of filling, the stencil tube including an outer surface, and at least two axially spaced apart filling outlets passing through a wall of the tube;
   a first stencil die positioned along the stencil tube and having an inner surface facing the outer surface of the tube in a region axially aligned with one filling outlet of the stencil tube, the first stencil die including at least one outlet extending from the inner surface of the first stencil die to an outer surface of the first stencil die;
   a second stencil die positioned along the stencil tube and spaced from the first stencil die, the second stencil die having an inner surface facing the outer surface of the tube in a region axially aligned with another filling outlet of the stencil tube, the second stencil die including at least one outlet extending from the inner surface of the second stencil die to an outer surface of the second stencil die;
a first filling infeed path at a first end of the stencil assembly for delivering filling into the stencil tube;
a first shut off valve extending from the first end of the stencil assembly into the stencil tube and having a distal end configured for sealing against an inner surface of the stencil tube;
a second filling infeed path at a second end of the stencil assembly for delivering filling into the stencil tube;
a second shut off valve extending from the second end of the stencil assembly into the stencil tube and having a distal end configured for sealing against the inner surface of the stencil tube;
wherein the first stencil die and second stencil die are separate pieces that are removable from the stencil tube separately;
wherein the first stencil die includes a first set of outlet openings and a second set of outlet openings, the second stencil die includes a third set of outlet openings and a fourth set of outlet openings, the first, second, third and fourth sets of outlet openings spaced axially from each other along the stencil tube in a manner to facilitate dispensing of filling onto four different wafers traveling past the stencil tube in four different rows, each row aligned with a respective one of the sets of outlet openings;
the stencil tube includes:
first and second filling outlets passing through the tube wall to the first stencil die, the first filling outlet aligned for feeding filling to the first set of outlet openings and the second filling outlet aligned for feeding filling to the second set of outlet openings;
third and fourth filling outlets passing through the tube wall to the second stencil die, the third filling outlet aligned for feeding filling to the third set of outlet openings and the fourth filling outlet aligned for feeding filling to the fourth set of outlet openings;
wherein the first shut-off valve includes a shut-off surface that is rotatable between open and closed positions, in the closed position the shut-off surface aligns with the first and second filling outlets to prevent flow from passing from inside the stencil tube to the first stencil die, the shut-off surface and first and second filling outlets cooperatively shaped and positioned such that when the shut-off surface is rotated to the open position the second filling outlet has a larger flow area than that of the first filling outlet to promote even flow through the first and second filling outlets; and
wherein the second shut-off valve includes a shut-off surface that is rotatable between open and closed positions, in the closed position the shut-off surface of the second shut-off valve aligns with the third and fourth filling outlets to prevent flow from passing from inside the stencil tube to the second stencil die, the shut-off surface of the second shut-off valve and the third and fourth filling outlets cooperatively shaped and positioned such that such that when the shut-off surface is rotated to the open position the fourth filling outlet has a larger flow area than that of the third filling outlet to promote even flow through the third and fourth filling outlets;
the first filling outlet is located nearer the first end of the stencil assembly than the second filling outlet;
the third filling outlet opening is nearer the second end of the stencil assembly than the fourth filling outlet opening.

2. The stencil die assembly of claim 1, further comprising:
a drive operatively linked to rotate the first stencil die about the stencil tube; and
a mechanical coupling linking the second stencil die to the first stencil die such that rotation of the first stencil die by the drive effects simultaneous and synchronous rotation of the second stencil die, the mechanical coupling defined by a separate component that is removably coupled to the first stencil die and second stencil die.

3. The stencil assembly of claim 2 wherein the mechanical coupling comprises an annular band positioned about the stencil tube intermediate the first stencil die and the second stencil die.

4. The stencil assembly of claim 3 wherein the annular band is keyed to both the first stencil die and the second stencil die.

5. The stencil assembly of claim 4 wherein the annular band includes a first keyway at one side edge keyed to the first stencil die and a second keyway at an opposite side edge keyed to the second stencil die, the first keyway offset circumferentially from the second keyway by one-hundred and twenty degrees.

6. The stencil assembly of claim 4 wherein the annular band is supported on the stencil assembly entirely by connection with the first stencil die and the second stencil die.

7. The stencil die assembly of claim 4 wherein the annular band is supported on the stencil assembly by connection with the first stencil die, connection with the second stencil die and at least one bushing positioned along an axial length of the annular band.

8. The stencil assembly of claim 4 wherein the annular band includes an inner surface facing the outer surface of the stencil tube, at least one opening extending from the inner surface of the annular band to an outer surface of the annular band for detecting undesired passing of filling beyond either the first stencil die or the second stencil die.

9. The stencil assembly of claim 1 wherein the distal end of the first shut off valve is positioned proximate the distal end of the second shut off valve.

10. A stencil assembly for use in depositing filling onto wafers traveling in four distinct rows, the stencil assembly comprising:
a stencil tube defining a lengthwise passage for flow of filling, the stencil tube including an outer surface, and at least first, second, third and fourth axially spaced apart filling outlets passing through a wall of the stencil tube and arranged in sequence when moving from a first end of the stencil tube to a second end of the stencil tube such that the first filling outlet is located closer to the first end than the second filling outlet and the fourth filling outlet is located closer to the second end than the third filling outlet;
a first stencil die positioned along the stencil tube in a region overlapping with the first and second filling outlets of the stencil tube, the first stencil die including a first set of outlet openings aligned to receive filling passing through the first filling outlet of the stencil tube and a second set of outlet openings aligned to received filling passing through the second filling outlet of the stencil tube; and
a second stencil die positioned along the stencil tube in a region overlapping with the third and fourth filling outlets of the stencil tube, the second stencil die including a third set of outlet openings aligned to receive filling passing through the third filling outlet of the stencil tube and a fourth set of outlet openings aligned to received filling passing through the fourth filling outlet of the stencil tube;

wherein the first stencil die and second stencil dies are separate pieces that are removable from the stencil tube separately;

wherein each of the first, second, third and fourth sets of outlet openings align with a respective one of the four distinct rows;

a first shut off valve that includes a shut-off surface that is rotatable between open and closed positions, in the closed position the shut-off surface aligns with the first and second filling outlets to prevent flow from passing from inside the stencil tube to the first stencil die, the shut-off surface and first and second filling outlets cooperatively shaped and positioned such that when the shut-off surface is rotated to the open position the second filling outlet has a larger flow area than that of the first filling outlet to promote even flow through the first and second filling outlets; and a second shut-off valve includes a shut-off surface that is rotatable between open and closed positions, in the closed position the shut-off surface of the second shut-off valve aligns with the third and fourth filling outlets to prevent flow from passing from inside the stencil tube to the second stencil die, the shut-off surface of the second shut-off valve and the third and fourth filling outlets cooperatively shaped and positioned such that such that when the shut-off surface is rotated to the open position the third filling outlet has a larger flow area than that of the fourth filling outlet to promote even flow through the third and fourth filling outlets.

11. The stencil assembly of claim 10 wherein a first valve is positioned within the stencil tube for controlling flow from the first infeed path to the first stencil die, a second valve is positioned with the stencil tube for controlling flow form the second infeed path to the second stencil tube, and the first valve and second valve are movable independently of each other.

* * * * *